Oct. 1, 1968 D. J. FEWINGS ET AL 3,404,297

PIEZO-ELECTRIC CRYSTAL CIRCUIT ARRANGEMENTS

Filed March 31, 1966 3 Sheets-Sheet 1

INVENTORS
David John Fewings
and
Harvey Joyce Pipe
BY Baldwin & Wight
ATTORNEY

PIEZO-ELECTRIC CRYSTAL CIRCUIT ARRANGEMENTS

Filed March 31, 1966 3 Sheets-Sheet 2

INVENTORS
David John Fewings
and
Harvey Jayce Pipe
BY Baldwin & Wight
ATTORNEYS

Oct. 1, 1968 D. J. FEWINGS ETAL 3,404,297

PIEZO-ELECTRIC CRYSTAL CIRCUIT ARRANGEMENTS

Filed March 31, 1966 3 Sheets-Sheet 3

INVENTORS
David John Fewings
and
Harvey Jayce Pipe
BY Baldwin & Wight
ATTORNEYS

United States Patent Office 3,404,297
Patented Oct. 1, 1968

3,404,297
PIEZO-ELECTRIC CRYSTAL CIRCUIT ARRANGEMENTS

David John Fewings, Chelmsford, and Harvey Joyce Pipe, Maldon, England, assignors to The Marconi Company Limited, London, England, a British company Filed Mar. 31, 1966, Ser. No. 539,059
Claims priority, application Great Britain, Apr. 13, 1965, 15,732/65
9 Claims. (Cl. 310—8.1)

ABSTRACT OF THE DISCLOSURE

A temperature control circuit arrangement is provided for a crystal control oscillator in which the crystal has an arched temperature-frequency characteristic. A temperature control voltage is provided by two potentiometers each including a thermistor in series with a resistance and a combining arrangement which combines the output voltages from across the thermistor of one potentiometer and the voltage across the resistor of the other potentiometer in such a manner as to produce an arched control voltage which is arched in the opposite sense to the arched temperature-frequency characteristic of the crystal and which has a turn-over point at substantially the same temperature as the turn-over point of the crystal. The control voltage is applied in any known manner to compensate for the variation of the oscillator frequency with temperature. For example, the control voltage may be utilized to alter the capacitance of a variable capacitance diode.

This invention relates to the piezo-electrical crystal circuit arrangements and more particularly to temperature-stabilised crystal circuit arrangements of the kind in which variations of the natural frequency of the crystal caused by ambient temperature variations, are at least partly compensated by temperature controlled adjustments of a frequency control circuit associated with the crystal usually a frequency control circuit including a varactor diode. For the sake of brevity such arrangements will hereinafter be called "temperature compensated crystal circuit arrangements." Temperature compensated crystal circuit arrangements have the advantage over those other well known arrangements in which the crystal is protected against ambient temperature changes by mounting it in a thermostatically controlled oven, that they avoid the necessity for the provision of the relatively large power which is required for heating such an oven. Also, of course, they avoid the need for the oven itself. They are, therefore, in general, much more suitable for use in portable and other equipments, where economy in bulk weight and power consumption is important. Temperature compensated crystal circuit arrangements as at present known, however, involve the use of undesirably costly and complex temperature controlled circuits in order to achieve a satisfactorily high degree of temperature compensation. Moreover many of them involve higher power consumption (despite that there is no oven) than is desirable. The present invention seeks to provide improved temperature compensated crystal circuit arrangements which shall be very simple and economical of apparatus and power consumption but which can nevertheless be designed to give a satisfactory high degree of temperature compensation. Moreover, as will be apparent later, arrangements in accordance with this invention may readily be made adjustable to provide a high degree of temperature compensation for any of a number of crystals of the same or similar nominal design but having different frequency-temperature characteristics inter se.

Figure 1:
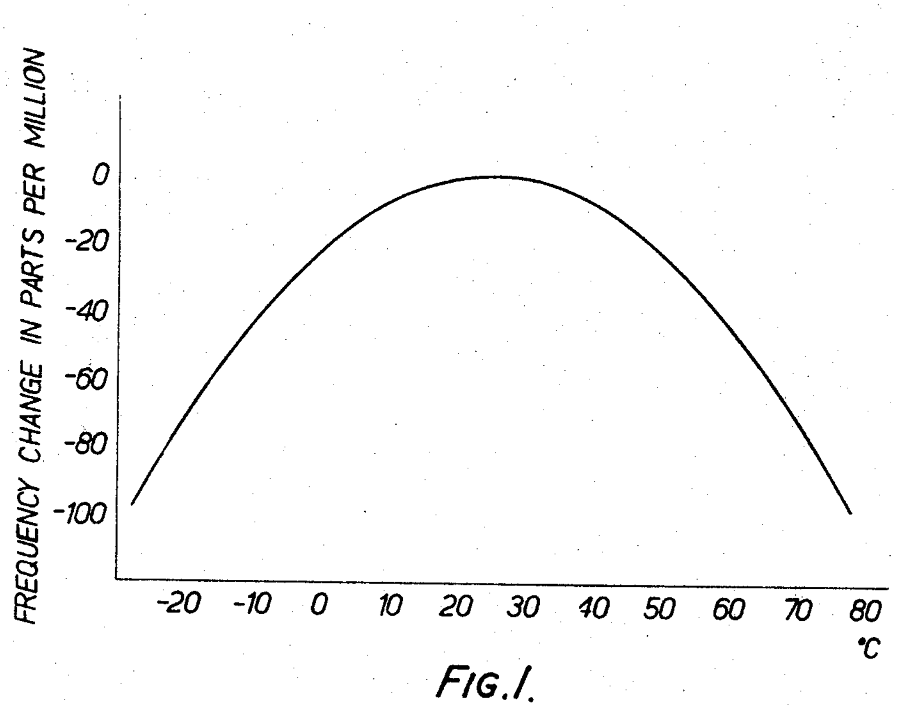
Figure 2:
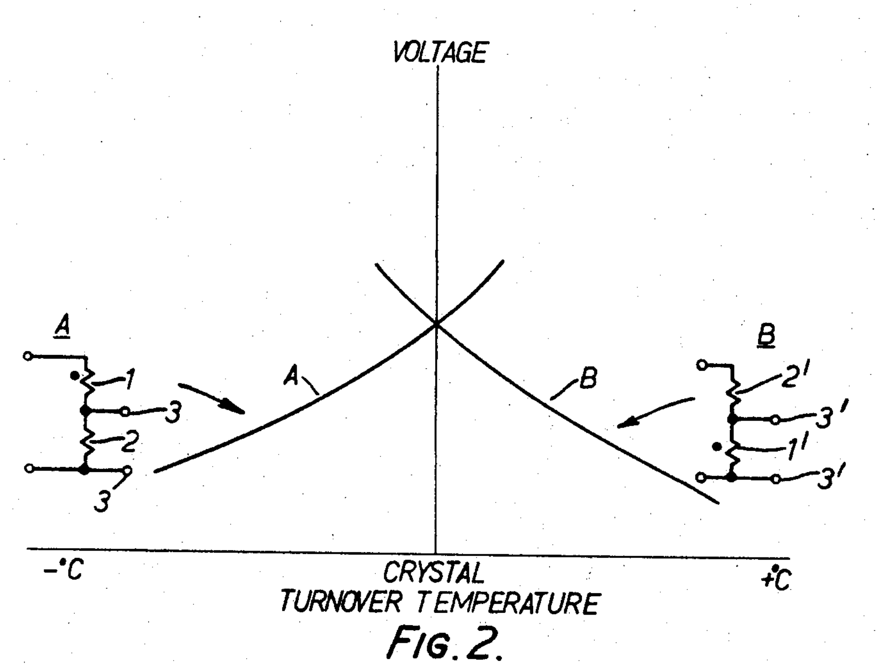
Figure 3:
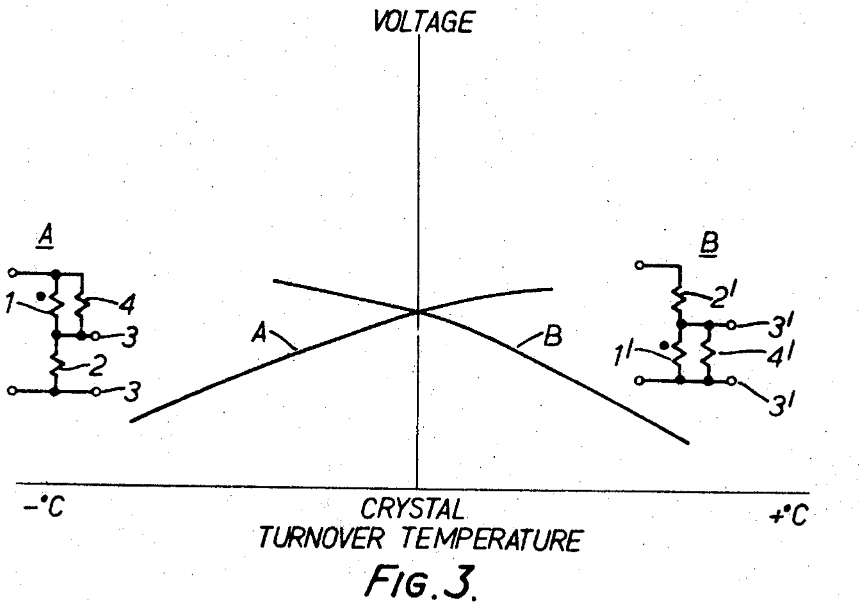
Figure 4:
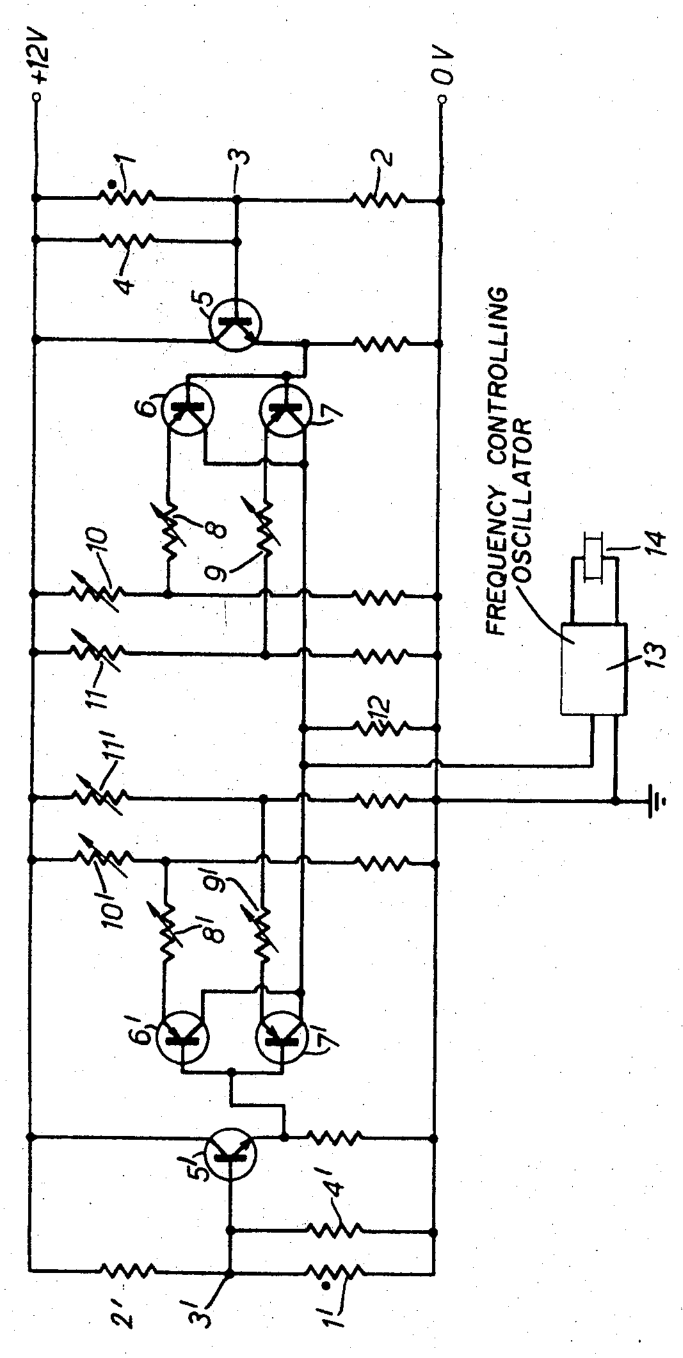

The invention is illustrated in and explained in connection with the accompanying drawings in which FIGURE 1 typifies the frequency-temperature characteristic of a range of crystals for which the invention may be advantageously employed; FIGURES 2 and 3 are graphical figures explanatory of the principles of the invention; and FIGURE 4 is a diagram of one embodiment of the invention.

There are numerous forms of crystals which exhibit a frequency-temperature characteristic, which is such that, with increase in temperature over a certain range, the natural frequency rises to a maximum at a certain temperature, herein termed the "turn-over temperature," and thereafter falls again, the whole curve being approximately parabolic and approximately symmetrical about the turn-over temperature. FIGURE 1, in which departures from a nominal frequency in parts per million are plotted as ordinates against temperature in ° C. as abscissae, typifies such a characteristic. Examples of such crystals, which will be herein termed "arched temperature characteristic crystals" are 5° X cut; NT cut; BT cut; CT cut; DT cut; ET cut; and Y cut crystals. Obviously, to secure temperature compensation of the frequency of an arched temperature characteristic crystal by means of a voltage controlled varactor diode or other frequency control circuit it is necessary to supply said circuit with a control voltage which varied with temperature in such manner that the freqeuncy control exercised is in accordance with a characteristic which is of U shape and is, to a sufficient degree of approximation, the mirrior image of the arch shaped temperature characteristic of the crystal to be compensated. The present invention provides very simple means for achieving this result.

Referring to FIGURE 2, if D.C. voltage is applied across a potentiometer which, as shown at A on the left side of FIGURE 2, consists of a thermistor 1 in series with an ordinary resistance 2, and voltage is taken off at 3 from across the resistance 2, the curve connecting that voltage (ordinates) with temperature (abscissae) will be of the nature of curve A of FIGURE 2. If as shown at B on the right side of FIGURE 2, voltage is taken off at 3' from across a thermistor (referenced 2') in series with an ordinary resistance (referenced 1') in a potentiometer across which D.C. voltage is applied, the curve connecting the voltage at terminals 3' with temperature will be of the nature of curve B of FIGURE 2. If, by suitable choice of the thermistors and ordinary resistances, the two curves are arranged to cross at or near the turnover temperature of the crystal, the resultant overall curve made up of the parts of the curves A and B below their intersection will be of a general shape suitable for utilisation to secure the required compensation. This overall curve is not in fact a parabolic arch but it is near enough to such an arch to enable good temperature compensation to be obtained.

The slopes of the curves A and B can be adjusted to produce quite close approximation to a desired overall curve shape. The effect of adding resistances in shunt with the thermistors 1 and 1' is to reduce the slopes of the curves A and A' and also slightly to modify their shapes. This is illustrated by FIGURE 3 which typifies the curves A and B obtained when shunt resistances 4 and 4' of suitable value are added across the thermistors 1 and 1' respectively.

The present invention utilises the principles above described with reference to FIGURES 2 and 3.

According to this invention a temperature compensated crystal circuit arrangement including an arched temperature characteristic crystal comprises two potentiometers each including a thermistor in series with a resistance, means for utilising voltages derived from across the thermistor in one potentiometer and from across the resistance in the other to produce a control voltage varying with temperature, and means for utilising the control voltage approximately to compensate for temperature-produced variations in the frequency of said crystal, the arrangement being such that the two derived voltages have the same value at a temperature at least approximately equal to the turn-over temperature of the crystal and the control voltage changes in the same direction for increasing departures in opposite directions from said turn-over temperature.

Additional resistances may be connected across the thermistors in the two potentiometers. These resistances may be adjustable if desired.

Each of the derived voltages may be applied to one or other of two amplifiers which are biassed to cut off when said derived voltages are of the common value they have at approximately the crystal turn-over temperature, increasing changes in one derived voltage from this value in response to changes in temperature in one direction being arranged to cause one amplifier to become increasingly conductive and increasing changes in the other derived voltage from said value in response to changes in temperature in the other direction being arranged to cause the other amplifier to become increasingly conductive, said amplifiers having a common output circuit from which the control voltage is taken.

At least one additional amplifier may be associated with each of the aforesaid two amplifiers, each additional amplifier being fed with the same derived voltage as the amplifier with which it is associated and having a common load circuit therewith, each of said additional amplifiers being independently biassed in such manner as to be rendered conductive with the amplifier with which it is associated but only after a predetermined departure of temperature from the crystal turn-over temperature.

Preferably the amplifiers are transistors each fed at its base with one or other derived voltages and each having its emitter biassed through a resistance from a tap on a potentiometer.

In the embodiment shown in FIGURE 4 the elements 1, 2, 4 and 1′, 2′, 4′ correspond with the elements carrying the same references in FIGURE 3 and are chosen to satisfy the principles already explained. The voltages set up at the junction points 3 and 3′ of the elements 1, 2 and 1′, 2′ are applied respectively to the bases of two emitter follower transistors 5, 5′ each feeding into a pair of transistors 6, 7 or 6′, 7′. The thermistor resistor combinations 1, 2, 4, and 1′, 2′, 4′ serve, with the emitter followers 5 and 5′, to provide voltage dividing potentiometer means having temperature variable output voltages and the emitter followers 5 and 5′ are connected to apply the temperature variable voltages to the transistors 6, 7 and 6′, 7′, each of which, in combination with their biasing provisions, constitute amplifiers. The emitters of the transistors 6, 7 are separately biassed through adjustable resistances 8, 9 respectively from points on separate potentiometers including adjustable resistances 10, 11 respectively. Similar biassing arrangements including adjustable resistances 8′, 9′ and potentiometers including adjustable resistances 10′, 11′ are provided for the transistors 6′, 7′ respectively. The collectors of the four transistors 6, 7, 6′, 7′ are connected to a common load resistance 12, the voltage across which is fed as control voltage to a frequency controlling varactor diode (not separately shown) included in an oscillator 13 of which the crystal 14 forms part. Oscillators of the type employable as the oscillator 13 of FIGURE 4, including a frequency controlling variable capacitance diode or varactor diode arrangement are known in the art as is evidenced by the United States Patent No. 3,176,244 to D. E. Newell and N. R. Malik, issued on Mar. 30, 1965. The oscillator arrangement 13, then, may be any suitably chosen arrangement capable of employing a control voltage in the controlling of crystal frequency.

The adjustable resistances 8, 9, 10, 11 and 8′, 9′, 10′, 11′ are set to cut off the transistors 6, 7, 6′, 7′. The control voltage will then be zero. The crystal frequency error is set to zero at the crystal turnover temperature and resistance 10′ is adjusted to the point at which, when the temperature is raised above said turnover temperature transistor 6′ begins to conduct and cause the production of a control voltage across the load resistance 12. The slope of the voltage curve thus produced by transistor 6′ can be adjusted by adjusting resistance 8′. It has been found in experimental practice that adjustment of 10′ and 8′ is sufficient to produce temperature compensation to within 1 part in a million for temperatures from the turn-over temperature up to about 50° C. Above this temperature a steeper voltage curve is usually required to maintain the same close degree of temperature compensation. This is achieved by the transistor 7′ which is caused to be rendered conductive at about 50° C. by suitable adjustment of resistance 11′ and which then contributes to the total control voltage as determined by adjustment of resistance 9′. The two transistors 6′, 7′, biassed and adjusted as to their operation as described, will together give good temperature compensation from the turn-over temperature up to about 60° C. If the operating range of temperature is to extend still higher one or more additional transistors, separately differently biassed in the same way as transistors 6′ and 7′, and each with its own adjustable emitter resistance corresponding to resistance 8′ or 9′ may be provided and arranged to be rendered conductive in turn so as individually to contribute to the total control voltage at different higher temperatures.

For temperatures below the turnover temperature the transistors 6′ and 7′ are cut off and the transistors 6 and 7 are brought into conduction successively in response to decreased temperature to provide control voltage across load resistance 12. Their operation is adjusted by adjusting resistances 10 and 11 and 8 and 9 which serve purposes corresponding to those, already described, of the resistances 10′, 11′ and 8′, and 9′ respectively. If the range of temperature downwards is extensive enough, to require it one or more further transistors, each with its own adjustments, may be provided in addiiton to the transistors 6 and 7 to come into conduction in turn at successively lower temperatures.

An important advantage of the embodiment of FIGURE 4 is that the adjustments enable good compensation to be obtained without having closely to specify thermistor transistor and varactor diode parameters. Once the best adjustments for any particular equipment have been found by trial and error—and this presents no difficulties—the adjustments may be locked or the adjustable resistances replaced by fixed resistances of the appropriate values.

Obviously the thermal time constants of the thermistors and the crystal should be as nearly equal as possible and they should be in the same housing or in similar housings. If this is not done a rapid change of ambient temperature could cause the thermistors and the crystal to change temperature at different rates and good compensation would be temporarily lost. Thus if the crystal is in an evacuated glass envelope, so also should be the thermistors. Ideally they should all be in the same housing or envelope but in practice it is normally sufficient to use the same type of housing or envelope for the crystal and for the thermistors. Obviously also the thermistor and crystal housings or envelopes (if separate) should be near enough together to be subjected to substantially the same temperature and the thermal masses and insulation from temperautre changes of both should be as nearly as practicable the same.

The power consumption of an arrangement in accordance with this invention can be made quite small. In a practical embodiment as illustrated in FIGURE 4 and experimentally tested the total feed current of the correcting circuits was only from 3 ma. at a crystal turnover temperature of about 25° C. to 8 ma. at temperatures of −10° C. and +60° C. Frequency stability of ±1 part in a million has been experimentally obtained without difficulty over this range of temperature.

We claim:

1. A temperature compensated crystal circuit arrangement comprising a crystal having an arched frequency-temperature characteristic exhibiting a turn-over temperature, voltage responsive frequency compensation means for controlling the frequency of said crystal, first potentiometer means including a resistor and thermistor connected in series for providing a first temperature dependent voltage, second potentiometer means including a further resistor and thermistor connected in series for providing a second temperature dependent voltage equal to said first temperature dependent voltage at approximately the turn-over temperature of said crystal and varying in the opposite direction from said first temperature dependent voltage for temperature variations in the same direction from said turn-over temperature, and means responsive to both said first and second voltages for providing a control voltage variable in the same direction for increases and decreases in temperautre from said turn-over temperature for applying said control voltage to said voltage responsive frequency compensation means.

2. An arrangement as claimed in claim 1 wherein said means responsive to both said first and second temperature dependent voltages includes first and second amplifiers, means for applying one of said first and second temperature dependent voltages to one of said first and second amplifiers and for applying the other of said first and second temperature dependent voltages to the other of said first and second amplifiers, each of said first and second amplifiers being biased to cut off when the one of said first and second voltages applied thereto is at substantially the common turn-over temperature voltage, said first amplifier becoming increasingly conductive in response to an increase in the one of said first and second voltages applied thereto upon an increase in temperature away from said turn-over temperature and said second amplifier becoming increasingly conductive in response to an increase in the other of said first and second voltages applied thereto upon a decrease in temperature away from said turn-over temperature.

3. An arrangement as claimed in claim 1 including connection means for connecting said first and second potentiometer means across a potential, said potentiometer means being connected in opposite directions across said connection means.

4. A temperature compensating circuit arrangement for use with a crystal oscillator including a crystal having an arched frequency-temperature characteristic exhibiting a turn-over temperature, increasing and decreasing variations in temperature from the turn-over temperature causing changes in crystal frequency in the same direction, and voltage responsive means for correcting the frequency of the crystal oscillator in response to voltages applied thereto; said arrangement comprising first and second voltage divider potentiometer means, each of said potentiometer means including a thermistor and a resistor connected in series, means for connecting a potential across said potentiometer means in opposite directions, said potentiometer means providing temperature dependent output voltages therefrom upon application of the potential thereto, the output voltages from said potentiometer means having like values at substantially said turn-over temperature, control voltage means responsive to the output voltages for providing a control voltage having an arched voltage-temperature characteristic wherein both increases and decreases in temperature from substantially said turn-over temperature result in changes in said control voltage in the same direction, whereby application of said control voltage to said voltage responsive means compensates for said arched frequency-temperature characteristic of said crystal.

5. The arrangement according to claim 4 wherein said control voltage means comprises first and second amplifiers, and means connecting said first amplifier to said first potentiometer means and said second amplifier to said second potentiometer means, each of said amplifiers including biasing means biasing said amplifier to cut off at the voltage applied thereto from its associated potentiometer means at substantially said turn-over temperature, the temperature dependent output voltage from one of said potentiometer means causing a change in one direction in the output voltage from said first amplifier and the output from the other of said potentiometer means causing a change in the same direction in the output voltage from said second amplifier, whereby said first amplifier output provides said control voltage for temperature in excess of said turn-over temperature and said second amplifier output provides said control voltage for temperatures below said turn-over temperatures.

6. The arrangement according to claim 5 further including third and fourth amplifiers, and means connecting said third amplifier to said first potentiometer means and said fourth amplifier with said second potentiometer means, means biasing said third and four amplifiers to cut off at a voltage other than the voltage at which said first and second amplifiers cut off, means for combining the output of said first and third amplifiers and for combining the outputs of said second and fourth amplifiers, whereby the combined output of said first and third amplifiers provides that portion of said arched voltage-temperature characteristic corresponding to increases in temperature beyond said turn-over temperature and the combined output of said second and fourth amplifiers provides that portion of said arched voltage-temperature characteristic corresponding to decreases below the turn-over temperature.

7. An arrangement as claimed in claim 1 wherein each of said potentiometer means includes an additional resistor, said resistor being connected across said thermistors in the two potentiometer means.

8. An arrangement as claimed in claim 2 further comprising at least one additional amplifier associated with each of said first and second amplifiers, each said additional amplifier being fed with the same one of said first and second voltages as the one of said first and second amplifiers with which it is associated and having a common load circuit therewith, each of said additional amplifiers being independently biased to be rendered conductive with the one of said first and second amplifiers with which it is associated only after a pre-determined departure of temperature from the crystal turn-over temperature.

9. An arrangement as claimed in claim 2 wherein said first and second amplifiers are transistors each fed at its base with one of said first and second voltages and each of said transistors having its emitter biased through a further resistance from a tap on a bias potentiometer.

References Cited

UNITED STATES PATENTS

| | | | |
|---|---|---|---|
| 2,286,437 | 6/1942 | Odell | 310—8.7 |
| 3,176,244 | 3/1965 | Newell | 310—8.1 |
| 3,260,960 | 7/1966 | Bangert | 331—116 |
| 3,297,961 | 1/1967 | Frerking | 331—116 |
| 3,302,138 | 1/1967 | Brown | 331—116 |
| 3,324,415 | 1/1967 | Sheffet | 331—116 |

FOREIGN PATENTS 1,020,080 12/1963 Great Britain.

J. D. MILLER, *Primary Examiner.*